(12) United States Patent
Bobenrieth

(10) Patent No.: US 10,753,114 B1
(45) Date of Patent: Aug. 25, 2020

(54) VEHICLE PARKING ASSISTANCE ASSEMBLY

(71) Applicant: Kevin Bobenrieth, St. Johns, FL (US)

(72) Inventor: Kevin Bobenrieth, St. Johns, FL (US)

(*) Notice: Subject to any disclaimer, the term of this patent is extended or adjusted under 35 U.S.C. 154(b) by 0 days.

(21) Appl. No.: 16/351,617

(22) Filed: Mar. 13, 2019

(51) Int. Cl.
  *E04H 6/42* (2006.01)
  *B60Q 9/00* (2006.01)

(52) U.S. Cl.
  CPC ............ *E04H 6/426* (2013.01); *B60Q 9/004* (2013.01)

(58) Field of Classification Search
  USPC ...................................... 340/932.2
  See application file for complete search history.

(56) References Cited

U.S. PATENT DOCUMENTS

| 4,808,997 A | 2/1989 | Barkley | |
|---|---|---|---|
| 4,870,413 A | 9/1989 | Walden | |
| 5,177,479 A * | 1/1993 | Cotton | B60Q 9/004 340/932.2 |
| 6,002,346 A | 12/1999 | Bowden | |
| 6,163,253 A | 12/2000 | Yaron | |
| 7,049,980 B1 * | 5/2006 | Chemelewski | B60Q 9/004 340/556 |
| 2004/0061627 A1 * | 4/2004 | Collopy | E06B 9/58 340/932.2 |
| 2005/0156758 A1 * | 7/2005 | Gilliss | G08G 1/164 340/932.2 |
| 2010/0245127 A1 | 9/2010 | Hong | |

FOREIGN PATENT DOCUMENTS

WO    WO1999021733    5/1999

\* cited by examiner

*Primary Examiner* — Thomas S McCormack

(57) ABSTRACT

A vehicle parking assistance assembly includes a pair of clamps removably clamped to a respective one of a pair of garage door rails on either side of a garage door opening. A light emitting unit emits a beam of light across the garage door opening. A receiving unit receives the beam of light emitted by the light emitting unit. A visual unit is positioned on a back wall of a garage to be visible to a driver of a vehicle entering the garage. The visual unit emits a visual alert to stop when the visual unit receives a clear signal from the receiving unit for alerting the driver that the vehicle has fully entered the garage. The visual unit emits a visual alert to go when the visual unit receives a blocked signal from the receiving unit for alerting the driver that the vehicle has not fully entered the garage.

11 Claims, 8 Drawing Sheets

US 10,753,114 B1

VEHICLE PARKING ASSISTANCE ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to parking devices and more particularly pertains to a new parking device for alerting a driver when a vehicle has fully entered a garage.

BRIEF SUMMARY OF THE INVENTION

An embodiment of the disclosure meets the needs presented above by generally comprising a pair of clamps each removably clamped to a respective one of a pair of garage door rails on either side of a garage door opening. A light emitting unit emits a beam of light across the garage door opening. A receiving unit receives the beam of light emitted by the light emitting unit. A visual unit is positioned on a back wall of a garage to be visible to a driver of a vehicle entering the garage. The visual unit emits a visual alert to stop when the visual unit receives a clear signal from the receiving unit for alerting the driver that the vehicle has fully entered the garage. The visual unit emits a visual alert to go when the visual unit receives a blocked signal from the receiving unit for alerting the driver that the vehicle has not fully entered the garage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
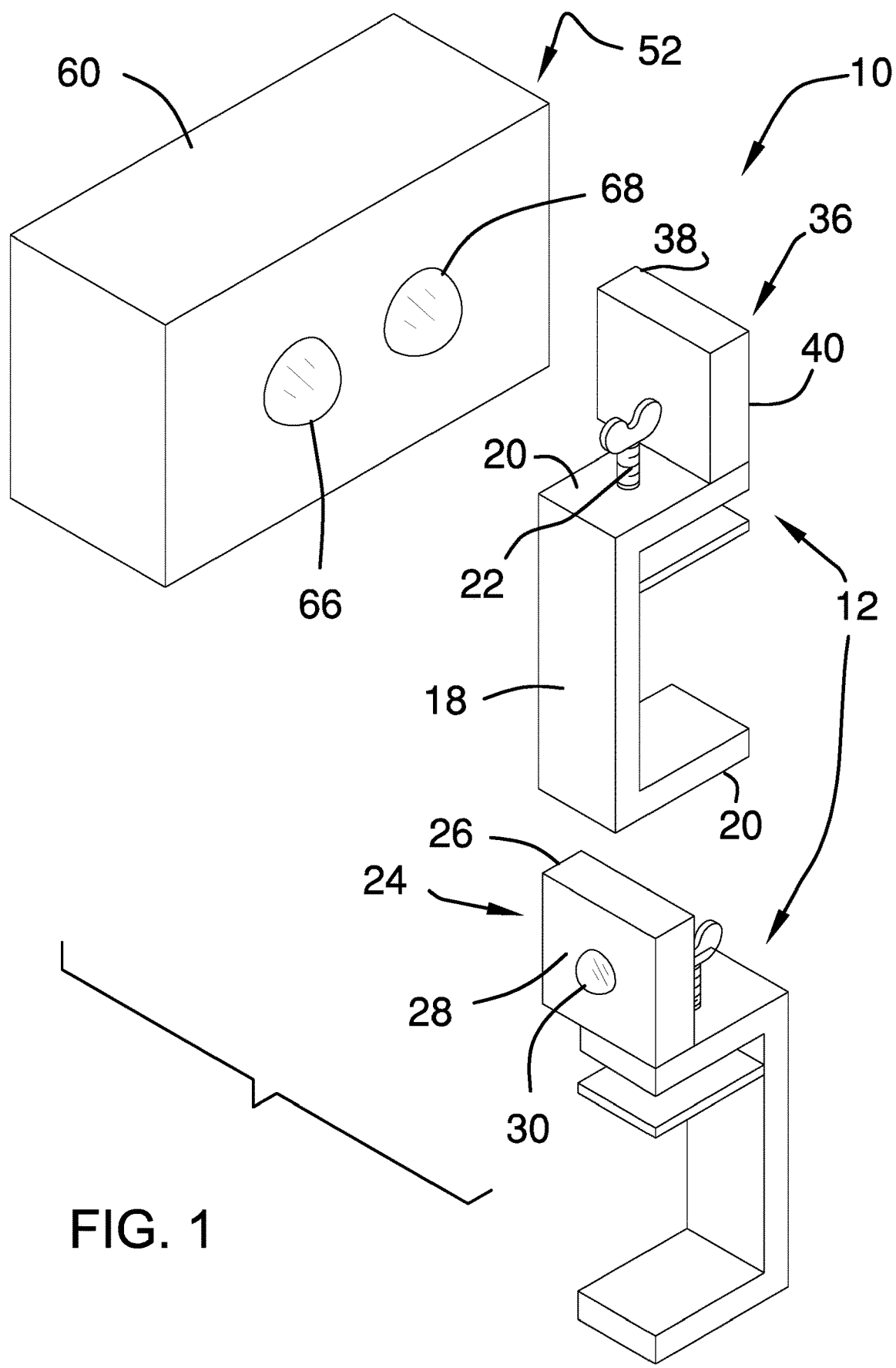
FIG. 1 is a perspective view of a vehicle parking assistance assembly according to an embodiment of the disclosure.
Figure 2:
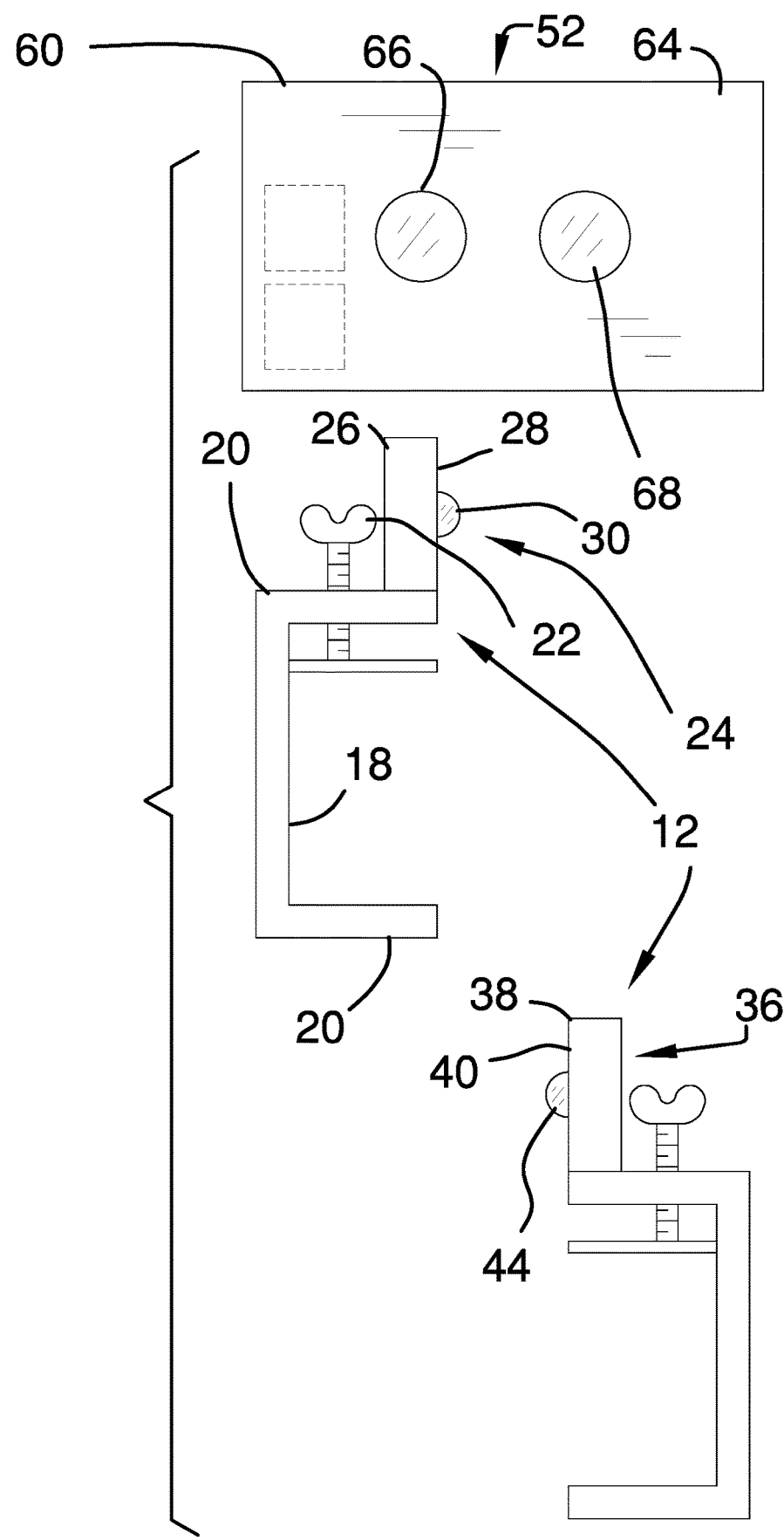
FIG. 2 is a front view of an embodiment of the disclosure.
Figure 3:
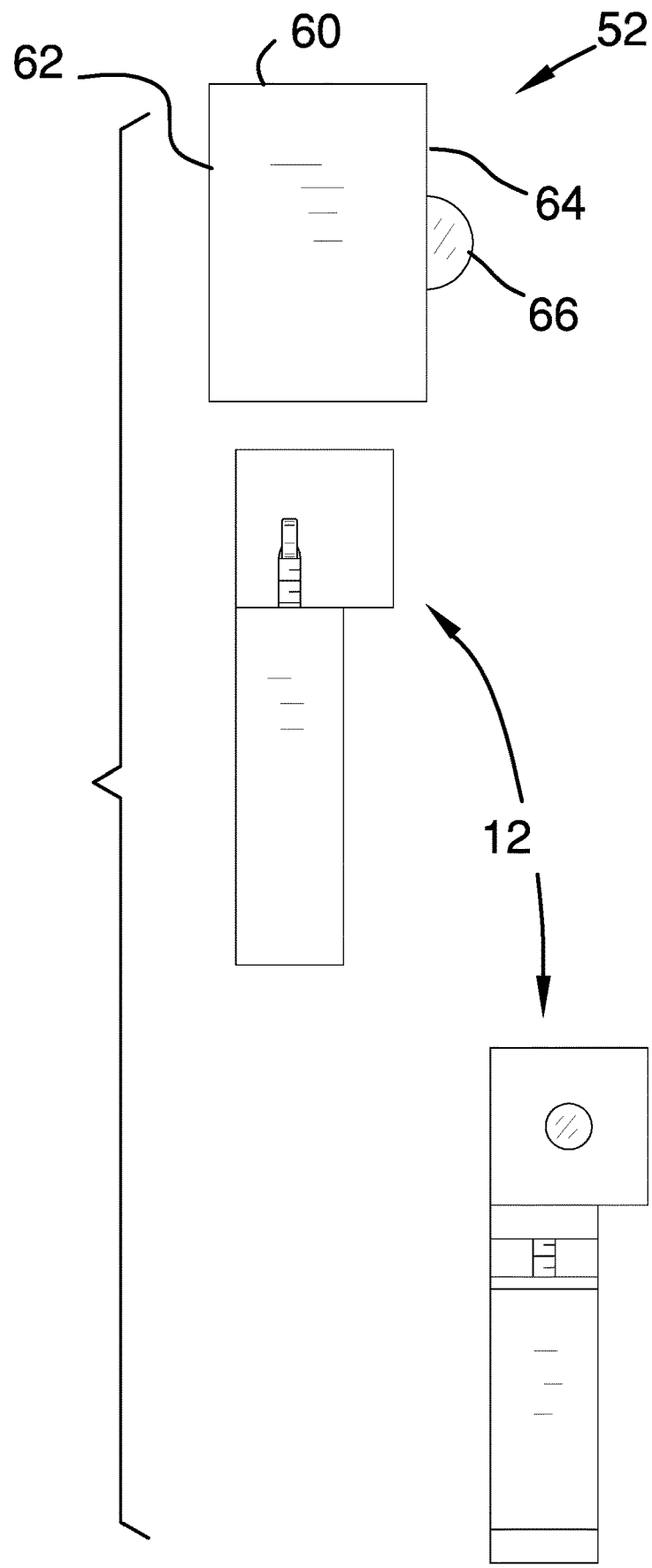
FIG. 3 is a right side view of an embodiment of the disclosure.

With reference now to the drawings, and in particular to FIGS. 1 through 8 thereof, a new parking device embodying the principles and concepts of an embodiment of the disclosure and generally designated by the reference numeral 10 will be described.

As best illustrated in FIGS. 1 through 8, the vehicle parking assistance assembly 10 generally comprises a pair of clamps 12 that is each removably clamped to a respective one of a pair of garage door rails 14 on either side of a garage door opening 16. Each of the clamps 12 is positionable at a selected height on the respective garage door rail 14. Each of the clamps 12 comprises a central section 18 extending between a pair of end sections 20 such that each of the clamps 12 forms a C shape. Moreover, the respective garage door rail 14 is positioned between the end sections 20 of each of the clamps 12. Each of the clamps 12 includes a screw 22 for tightening against the respective garage door rail 14 for retaining the clamps 12 on the respective garage door rail 14 and each of the clamps 12 is horizontally aligned with each other on the garage door rails 14.

A light emitting unit 24 is provided and the light emitting unit 24 is coupled to a respective one of the garage door rails 14. Thus, the light emitting unit 24 emits a beam of light across the garage door opening 16. It should be noted that the light emitting unit 24 is separate from a garage door opener sensor and is in no way associated with opening and closing a garage door. The light emitting unit 24 comprises a light housing 26 that is coupled to and extends upwardly from a respective one of the end sections 20 of a respective one of the clamps 12.

The light housing 26 has a first wall 28 and the first wall 28 is directed to face the opposing garage door rail 14 with respect to the clamp 12 on which the light housing 26 is attached. A light emitter 30 is coupled to the first wall 28 of the light housing 26 to emit a beam of light across the garage door opening 16. The light emitter 30 may be a laser light emitter or the like. A light power supply 32 is positioned in the light housing 26, the light power supply 32 is electrically coupled to the light emitter 30 and the light power supply 32 comprises at least one battery 34.

A receiving unit 36 is provided and the receiving unit 36 is coupled to an opposing garage door rail 14 with respect to the light housing 26. Moreover, the receiving unit 36 is horizontally aligned with the light housing 26 such that the receiving unit 36 receives the beam of light emitted by the light emitting unit 24. The receiving unit 36 broadcasts a clear signal when the receiving unit 36 receives the beam of light. Additionally, the receiving unit 36 broadcasts a blocked signal when the receiving unit 36 does not receive the beam of light.

The receiving unit 36 comprises a receiving housing 38 that is coupled to a respective one of the end sections 20 of a respective one of the clamps 12. The receiving housing 38 has a primary wall 40 and the primary wall 40 is directed toward the first wall 28 of the light housing 26. A control circuit 42 is positioned within the receiving housing 38 and the control circuit 42 receives a clear input and a blocked input. A light receiver 44 is coupled to the primary wall 40 to receive the beam of light emitted by the light emitter 30. The light receiver 44 is electrically coupled to the control circuit 42 and the control circuit 42 receives the clear input when the light receiver 44 receives the beam of light from the light emitter 30. Additionally, the control circuit 42 receives the blocked input when the light receiver 44 does not receive the beam of light from the light emitter 30. The light receiver 44 may be a laser light receiver or other type of electronic light sensor for sensing a high intensity beam of light.

A transmitter 46 is positioned within the receiving housing 38 and the transmitter 46 is electrically coupled to the control circuit 42. The transmitter 46 transmits a clear signal when the control circuit 42 receives the clear input, and the transmitter 46 transmits a blocked signal when the control circuit 42 receives the blocked input. The transmitter 46 may be a radio frequency transmitter or the like and the transmitter 46 may employ Bluetooth communication protocols. A receiving power supply 48 is positioned within the receiving housing 38, the receiving power supply 48 is electrically coupled to the control circuit 42 and the receiving power supply 48 comprises at least one battery 50.

A visual unit 52 is positioned on a back wall 54 of a garage 56 such that the visual unit 52 is visible to a driver of a vehicle 58 entering the garage 56. Moreover, the visual unit 52 is in electrical communication with the receiving unit 36. The visual unit 52 emits a visual alert to stop when the visual unit 52 receives the clear signal from the receiving unit 36. In this way the visual unit 52 alerts the driver that the vehicle 58 has fully entered the garage 56, and that the driver can stop the vehicle 58. The visual unit 52 emits a visual alert to go when the visual unit 52 receives the blocked signal from the receiving unit 36. In this way the visual unit 52 alerts the driver that the vehicle 58 has not fully entered the garage 56, and that the driver should continue driving forward.

The visual unit 52 comprises a visual housing 60 that has a rear wall 62 and a front wall 64, and the rear wall 62 is attached to the back wall 54 of the garage. A visual control circuit 65 is positioned within the visual unit 52 and the visual control circuit 65 receives both a blocked input and a clear input. A blocked light emitter 66 is coupled to the front wall 64 of the visual housing 60 and the blocked light emitter 66 emits red light from the visual housing 60 when the blocked light emitter 66 is turned on. The blocked light emitter 66 is turned on when the visual control circuit 65 receives the blocked input. In this way the blocked light emitter 66 visually communicates to the driver that the driver should continue to drive into the garage. The blocked light emitter 66 may be a red LED or other electronic source of red light.

A clear light emitter 68 is coupled to the front wall 64 of the visual housing 60 and the clear light emitter 68 emits green light from the visual housing 60 when the clear light emitter 68 is turned on. The clear light emitter 68 is turned on when the visual control circuit 65 receives the clear input. In this way the clear light emitter 68 visually communicates to the driver that the driver should clear the vehicle 58. The clear light emitter 68 may be a green LED or other electronic source of green light.

A receiver 70 is positioned in the visual housing 60 and the receiver 70 is electrically coupled to the visual control circuit 65. Additionally, the receiver 70 is in wireless electrical communication with the transmitter 46 in the receiving housing 38. The receiver 70 receives the clear signal and the blocked signal from the transmitter 46. Moreover, the visual control circuit 65 receiving the blocked input when the receiver 70 receives the blocked signal, and the visual control circuit 65 receiving the clear input when the receiver 70 receives the clear input. The receiver 70 may be a radio frequency receiver or the like and the receiver 70 may employ Bluetooth communication protocols. A visual power supply 72 is positioned in the visual housing 60, the visual power supply 72 is electrically coupled to the visual control circuit 65 and the visual power supply 72 comprises at least one battery 74.

Figure 4:
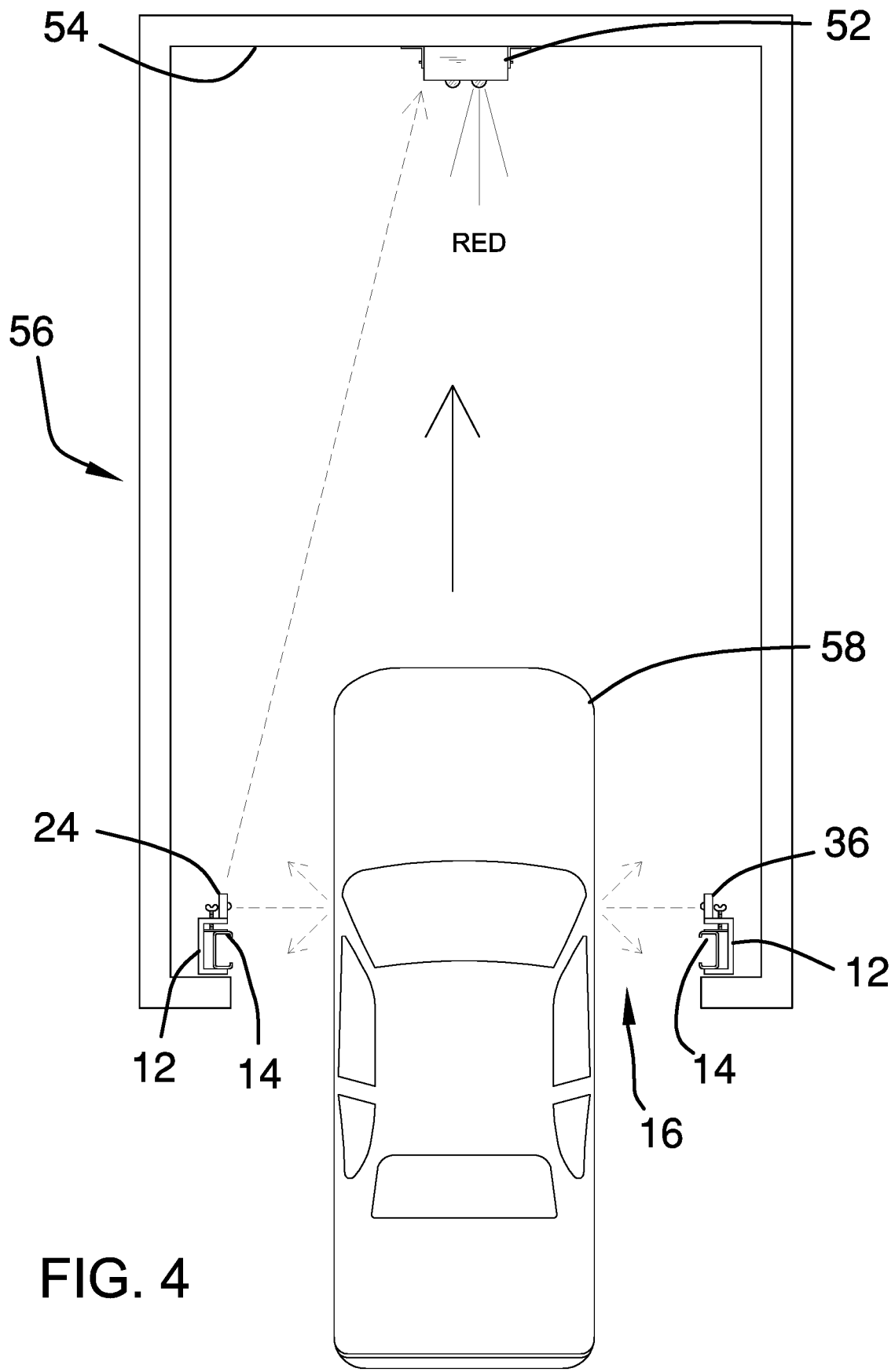
FIG. 4 is a perspective in-use view of an embodiment of the disclosure showing a vehicle entering a garage.
Figure 5:
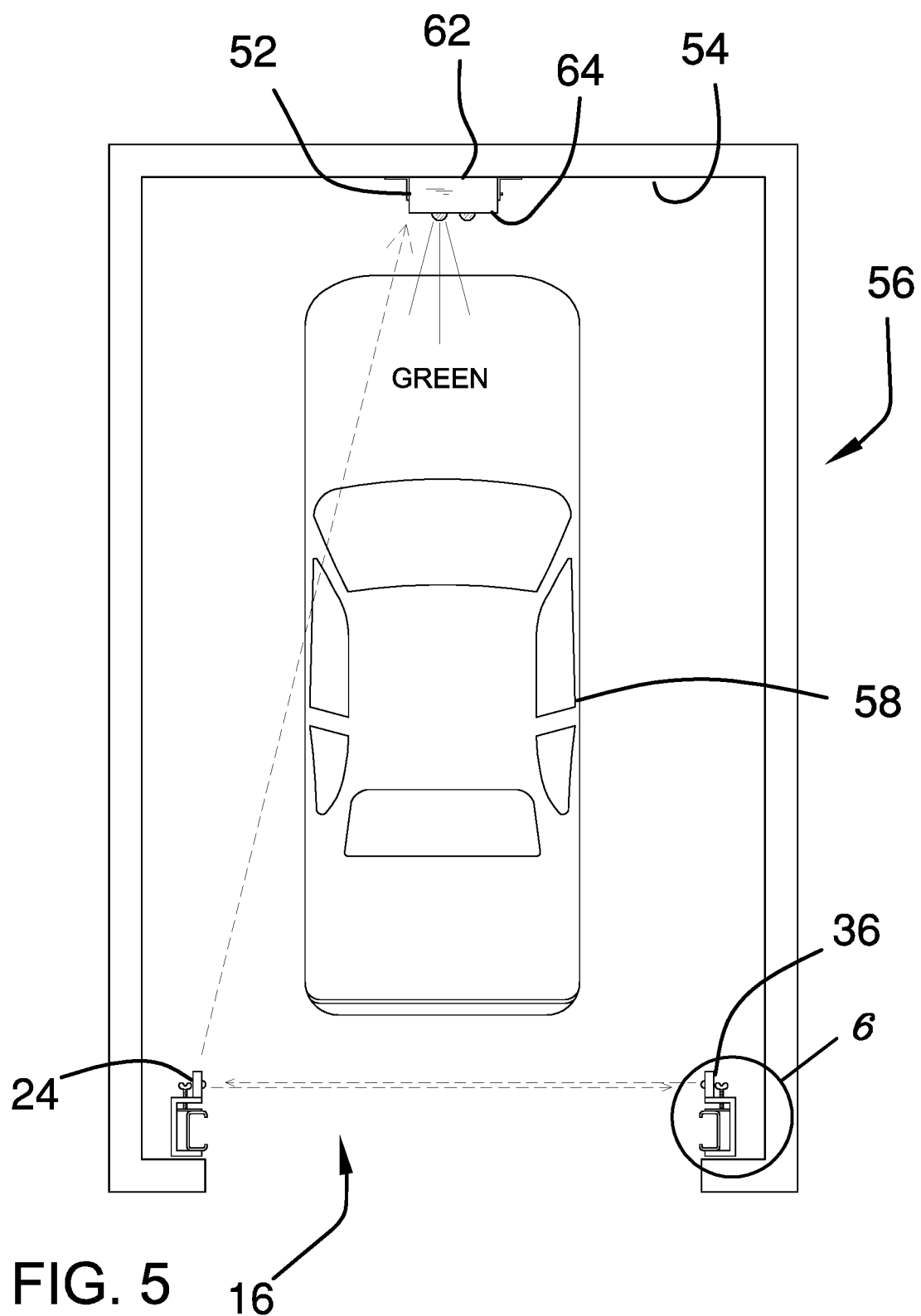
FIG. 5 is a perspective in-use view of an embodiment of the disclosure showing a vehicle having fully entered a garage.
Figure 6:
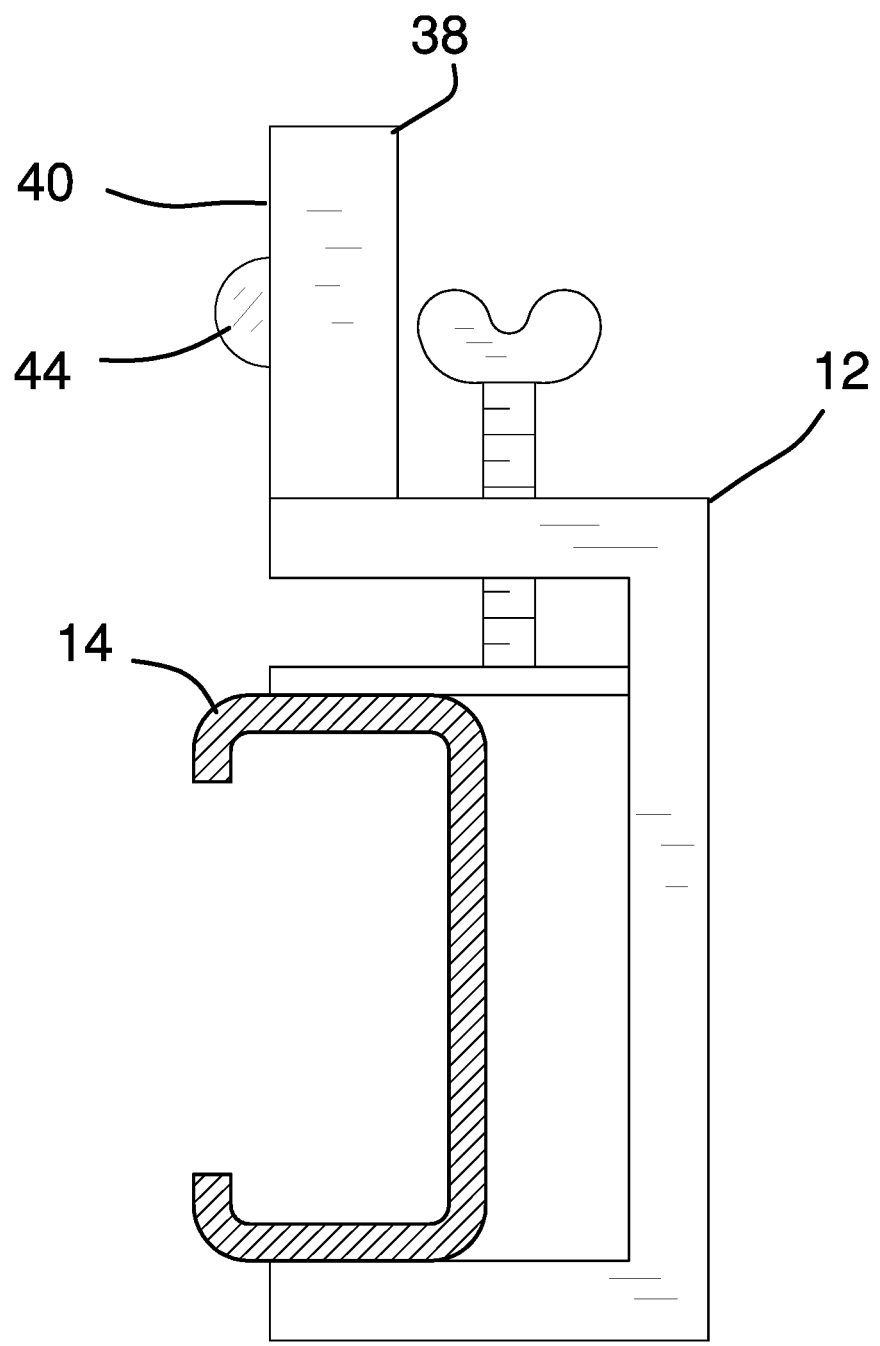
FIG. 6 is a cross sectional view taken along line 6-6 of FIG. 5 of an embodiment of the disclosure.
Figure 7:
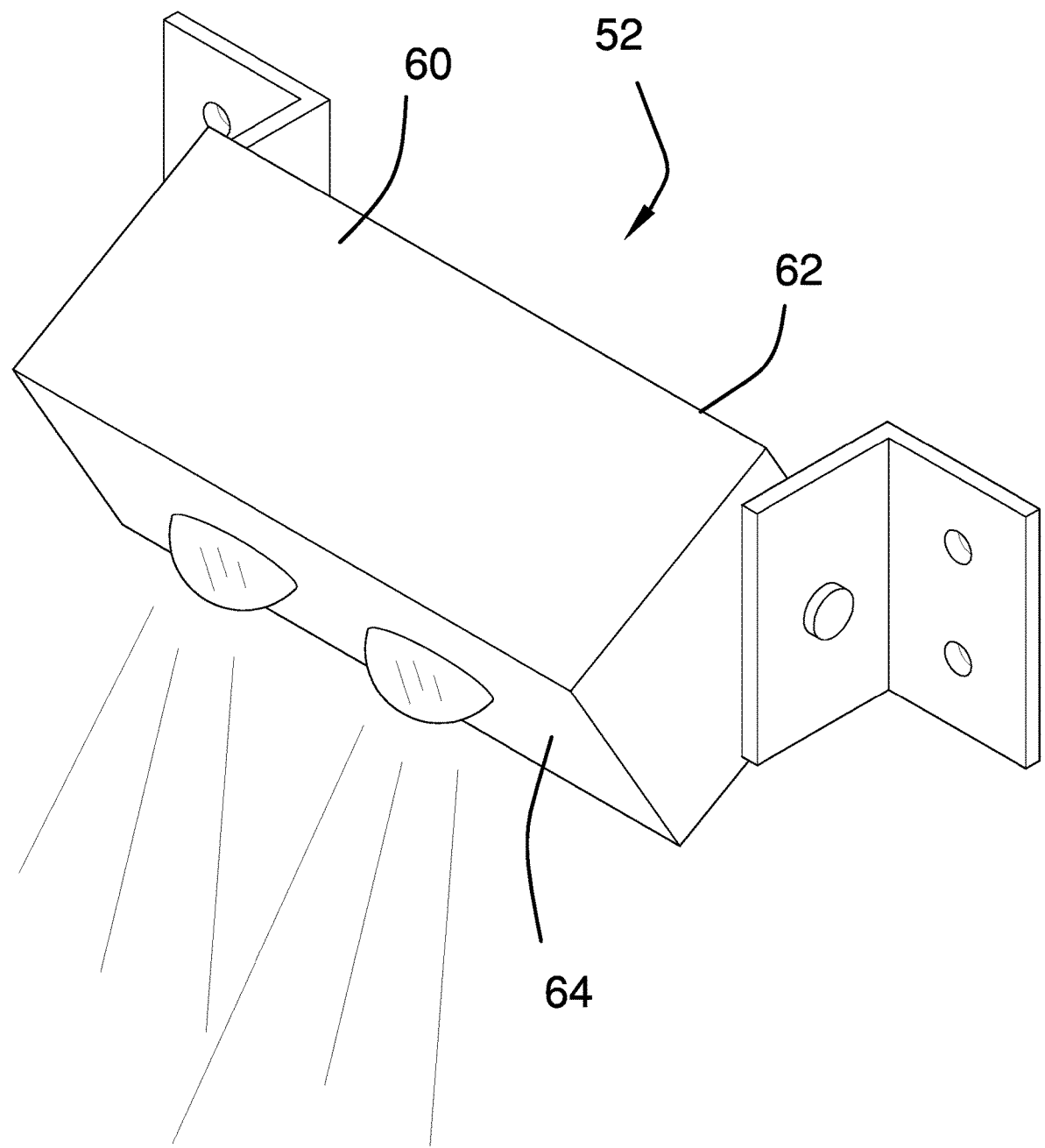
FIG. 7 is a perspective view of visual unit of an embodiment of the disclosure.
Figure 8:
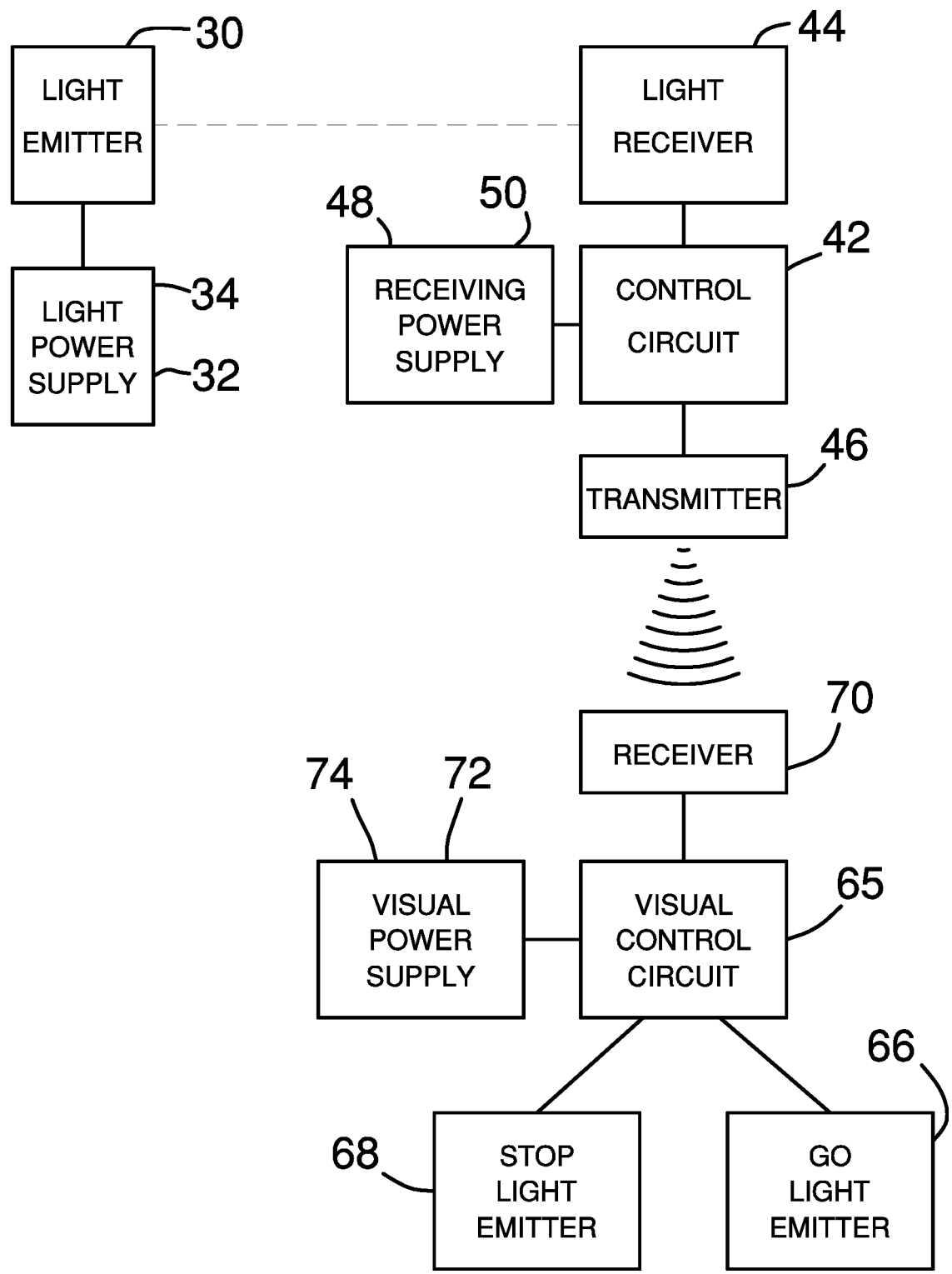
FIG. 8 is a schematic view of an embodiment of the disclosure.

In use, each of the clamps 12 is clamped onto the respective garage door rail 14 and the clamps 12 are horizontally aligned with each other. Thus, the light receiver 44 is positioned to receive the beam of light emitted by the light emitter 30. As shown in FIG. 4, the vehicle 58 interrupts the beam of light when the vehicle 58 begins to enter the garage 56. Thus, the blocked light emitter 66 on the visual unit 52 is illuminated to communicate to the driver that the driver needs to continue driving into the garage 56. As shown in FIG. 5, the light receiver 44 receives the beam of light once the vehicle 58 has driven fully beyond the garage door rails 14. Thus, the blocked light emitter 66 is turned off and the clear light emitter 68 is turned on. In this way the driver is notified that the vehicle 58 has fully entered the garage 56 and that the driver should stop driving forward. Thus, the driver can ensure that the vehicle 58 will not be struck by the garage door when the garage door is closed, and the driver can avoid striking the back wall 54 of the garage 56.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle parking assistance assembly being configured to emit a visual alert when a vehicle has been fully parked in a garage, said assembly comprising:
    a pair of clamps, each of said clamps being removably clamped to a respective one of a pair of garage door rails on either side of a garage door opening, each of said clamps being positionable at a selected height on the respective garage door rail, each of said clamps comprising a central section extending between a pair of end sections such that each of said clamps forms a C shape, said end sections being in a fixed spaced parallel position relative to each other, each of said clamps including a screw threadedly extending through an associated one of said end sections and a respective plate coupled to an end of said screw positioned between said end sections wherein tightening of said screw is configured to urge said plate against the respective garage door rail for retaining said clamps on the respective garage door rail, each of said clamps being horizontally aligned with each other on the garage door rails;
    a light emitting unit being coupled to a respective one of said garage door rails for emitting a beam of light across the garage door opening;
    a receiving unit being coupled to an opposing garage door rail with respect to said light emitting housing, said receiving unit being horizontally aligned with said light emitting housing such that said receiving unit receives the beam of light emitted by said light emitting unit, said receiving unit broadcasting a clear signal when said receiving unit receives the beam of light, said receiving unit broadcasting a blocked signal when said receiving unit does not receive the beam of light; and
    a visual unit being positioned on a back wall of a garage wherein said visual unit is configured to be visible to a driver of a vehicle entering the garage, said visual unit being in electrical communication with said receiving unit, said visual unit emitting a visual alert to clear when said visual unit receives said clear signal from said receiving unit wherein said visual unit is configured to alert the driver that the vehicle has fully entered the garage, said visual unit emitting a visual alert to blocked when said visual unit receives said blocked signal from said receiving unit wherein said visual unit is configured to alert the driver that the vehicle has not fully entered the garage.

2. The assembly according to claim 1, wherein said light emitting unit comprises a light housing being coupled to and extending upwardly from a respective one of said end sections of a said respective one of said clamps, said light housing having a first wall, said first wall being directed to face the opposing garage door rail with respect to said clamp on which said light housing is attached.

3. The assembly according to claim 2, further comprising:
    a light emitter being coupled to said first wall of said light housing wherein said light emitter is configured to emit a beam of light across the garage door opening; and
    a light power supply being positioned in said light housing, said light power supply being electrically coupled to said light emitter, said light power supply comprising at least one battery.

4. The assembly according to claim 3, wherein said receiving unit comprises:
    a receiving housing being coupled to a respective one of said end sections of a respective one of said clamps, said receiving housing having a primary wall, said primary wall being directed toward said first wall of said light housing; and
    a control circuit being positioned within said receiving housing, said control circuit receiving a clear input and a blocked input.

5. The assembly according to claim 4, further comprising a light receiver being coupled to said primary wall wherein said light receiver is configured to receive the beam of light emitted by said light emitter, said light receiver being electrically coupled to said control circuit, said control circuit receiving said clear input when said light receiver receives the beam of light from said light emitter, said control circuit receiving said blocked input when said light receiver does not receive the beam of light from said light emitter.

6. The assembly according to claim 5, further comprising:
    a transmitter being positioned within said receiving housing, said transmitter being electrically coupled to said control circuit, said transmitter transmitting a clear signal when said control circuit receives said and clear input, said transmitter transmitting a blocked signal when said control circuit receives said blocked input; and
    a receiving power supply being positioned within said receiving housing, said receiving power supply being electrically coupled to said control circuit, said receiving power supply comprising at least one battery.

7. The assembly according to claim 1, wherein said visual unit comprises:
    a visual housing having a rear wall and a front wall, said rear wall being attached to the back wall of the garage; and
    a visual control circuit being positioned within said visual unit, said visual control circuit receiving a blocked input and a clear input.

8. The assembly according to claim 7, further comprising a blocked light emitter being coupled to said front wall of said visual housing wherein said blocked light emitter is configured to emit red light from said visual housing, said blocked light emitter being turned on when said visual control circuit receives said blocked input wherein said blocked light emitter is configured to visually communicate to the driver that the driver should continue to drive into the garage.

9. The assembly according to claim 8, further comprising a clear light emitter being coupled to said front wall of said visual housing wherein said clear light emitter is configured to emit green light from said visual housing, said clear light emitter being turned on when said visual control circuit receives said clear input wherein said clear light emitter is configured to visually communicate to the driver that the driver should clear the vehicle.

10. The assembly according to claim 9, further comprising:
    a transmitter being included with said receiving unit, said transmitter broadcasting a clear signal and a blocked signal;

a receiver being positioned in said visual housing, said receiver being electrically coupled to said visual control circuit, said receiver being in wireless electrical communication with said transmitter, said receiver receiving said clear signal and said blocked signal from said transmitter, said visual control circuit receiving said blocked input when said receiver receives said blocked signal, said visual control circuit receiving said clear input when said receiver receives said clear input; and a visual power supply being positioned in said visual housing, said visual power supply being electrically coupled to said visual control circuit, said visual power supply comprising at least one battery.

11. A vehicle parking assistance assembly being configured to emit a visual alert when a vehicle has been fully parked in a garage, said assembly comprising:

a pair of clamps, each of said clamps being removably clamped to a respective one of a pair of garage door rails on either side of a garage door opening, each of said clamps being positionable at a selected height on the respective garage door rail each of said clamps being horizontally aligned with each other on the garage door rails, each of said clamps comprising a central section extending between a pair of end sections such that each of said clamps forms a C shape, said end sections being in a fixed spaced parallel position relative to each other, each of said clamps including a screw threadedly extending through an associated one of said end sections and a respective plate coupled to an end of said screw positioned between said end sections wherein tightening of said screw is configured to urge said plate against the respective garage door rail for retaining said clamps on the respective garage door rail;

a light emitting unit being coupled to a respective one of said garage door rails for emitting a beam of light across the garage door opening, said light emitting unit comprising:

a light housing being coupled to and extending upwardly from a respective one of said end sections of a said respective one of said clamps, said light housing having a first wall, said first wall being directed to face the opposing garage door rail with respect to said clamp on which said light housing is attached;

a light emitter being coupled to said first wall of said light housing wherein said light emitter is configured to emit a beam of light across the garage door opening; and a light power supply being positioned in said light housing, said light power supply being electrically coupled to said light emitter, said light power supply comprising at least one battery;

a receiving unit being coupled to an opposing garage door rail with respect to said light emitting housing, said receiving unit being horizontally aligned with said light emitting housing such that said receiving unit receives the beam of light emitted by said light emitting unit, said receiving unit broadcasting a clear signal when said receiving unit receives the beam of light, said receiving unit broadcasting a blocked signal when said receiving unit does not receive the beam of light, said receiving unit comprising:

a receiving housing being coupled to a respective one of said end sections of a respective one of said clamps, said receiving housing having a primary wall, said primary wall being directed toward said first wall of said light housing;

a control circuit being positioned within said receiving housing, said control circuit receiving a clear input and a blocked input;

a light receiver being coupled to said primary wall wherein said light receiver is configured to receive the beam of light emitted by said light emitter, said light receiver being electrically coupled to said control circuit, said control circuit receiving said clear input when said light receiver receives the beam of light from said light emitter, said control circuit receiving said blocked input when said light receiver does not receive the beam of light from said light emitter;

a transmitter being positioned within said receiving housing, said transmitter being electrically coupled to said control circuit, said transmitter transmitting a clear signal when said control circuit receives said and clear input, said transmitter transmitting a blocked signal when said control circuit receives said blocked input; and a receiving power supply being positioned within said receiving housing, said receiving power supply being electrically coupled to said control circuit, said receiving power supply comprising at least one battery; and a visual unit being positioned on a back wall of a garage wherein said visual unit is configured to be visible to a driver of a vehicle entering the garage, said visual unit being in electrical communication with said receiving unit, said visual unit emitting a visual alert to clear when said visual unit receives said clear signal from said receiving unit wherein said visual unit is configured to alert the driver that the vehicle has fully entered the garage, said visual unit emitting a visual alert to blocked when said visual unit receives said blocked signal from said receiving unit wherein said visual unit is configured to alert the driver that the vehicle has not fully entered the garage, said visual unit comprising:

a visual housing having a rear wall and a front wall, said rear wall being attached to the back wall of the garage;

a visual control circuit being positioned within said visual unit, said visual control circuit receiving a blocked input and a clear input;

a blocked light emitter being coupled to said front wall of said visual housing wherein said blocked light emitter is configured to emit red light from said visual housing, said blocked light emitter being turned on when said visual control circuit receives said blocked input wherein said blocked light emitter is configured to visually communicate to the driver that the driver should continue to drive into the garage;

a clear light emitter being coupled to said front wall of said visual housing wherein said clear light emitter is configured to emit green light from said visual housing, said clear light emitter being turned on when said visual control circuit receives said clear input wherein said clear light emitter is configured to visually communicate to the driver that the driver should clear the vehicle;

a receiver being positioned in said visual housing, said receiver being electrically coupled to said visual control circuit, said receiver being in wireless electrical communication with said transmitter, said receiver receiving said clear signal and said blocked signal from said transmitter, said visual control circuit receiving said blocked input when said receiver receives said blocked signal, said visual control circuit receiving said clear input when said receiver receives said clear input; and a visual power supply being positioned in said visual housing, said visual power supply being electrically coupled to said visual control circuit, said visual power supply comprising at least one battery.

* * * * *